(12) United States Patent
Etcheverry (10) Patent No.: US 6,644,670 B2
(45) Date of Patent: Nov. 11, 2003

(54) SEALING GASKETS FOR WATER CLOSETS

(75) Inventor: Miguel Esteban Etcheverry, Buenos Aires (AR)

(73) Assignee: Peb S.A. (AR)

( * ) Notice: Subject to any disclaimer, the term of this patent is extended or adjusted under 35 U.S.C. 154(b) by 42 days.

(21) Appl. No.: 09/879,266

(22) Filed: Jun. 12, 2001

(65) Prior Publication Data

US 2002/0067006 A1 Jun. 6, 2002

(30) Foreign Application Priority Data

Dec. 1, 2000 (AR) .................................. M 00 01 05380
Dec. 1, 2000 (AR) .................................. M 00 01 05379

(51) Int. Cl.[7] .......................... F16L 5/02; F16L 17/073; F16L 17/00; E03D 11/16; E03D 11/00

(52) U.S. Cl. ..................... 277/606; 277/609; 277/612; 277/616; 277/626; 277/644; 4/252.4; 52/171.1; 52/302.3; 285/56

(58) Field of Search .................. 277/602, 606, 277/607, 609, 612, 616, 628, 630, 634, 626, 641, 644, 648; 52/171.1, 302.3, 220.8; 285/56; 4/252.1, 252.4, 252.5, 252.6

(56) References Cited

U.S. PATENT DOCUMENTS

| | | | | |
|---|---|---|---|---|
| 2,976,543 A | * | 3/1961 | Turner et al. | 4/252.6 |
| 3,334,774 A | * | 8/1967 | Poltorak | 220/378 |
| 3,775,780 A | * | 12/1973 | McEwen | 4/252.4 |
| 3,871,034 A | * | 3/1975 | Weigel | 4/252.6 |
| 4,482,161 A | * | 11/1984 | Izzi, Sr. | 277/606 |
| 4,908,885 A | * | 3/1990 | Antos | 4/321 |
| 4,991,858 A | * | 2/1991 | Abila et al. | 277/606 |
| 5,115,554 A | * | 5/1992 | Fell, Sr. | 4/252.4 |
| 5,377,361 A | * | 1/1995 | Piskula | 4/252.4 |
| 5,492,372 A | * | 2/1996 | Dranberg | 285/56 |
| 6,394,505 B1 | * | 5/2002 | Schmucki et al. | 285/148.26 |

* cited by examiner

Primary Examiner—Lloyd A. Gall
Assistant Examiner—Vishal Patel
(74) Attorney, Agent, or Firm—Lahive & Cockfield, LLP (57) ABSTRACT

A gasket for sealing between a water closet and the floor or other supporting structure. In cross section it includes a flat seat for the base of the closet, an outer flange for sealing against the outer edge of the base and an inner sealing rib formed for hinge-like deflection by and toward the base as the latter is seated. The gasket is adapted to conform to various perimetrical shapes of bases, and may include an integral gasket and sealing section for annularly and sealingly engaging the drain joint of the water closet and the surface of the floor or other supporting structure.

16 Claims, 9 Drawing Sheets

SEALING GASKETS FOR WATER CLOSETS

BACKGROUND OF THE INVENTION

This application claims the benefit of the filing date of applications nos. M 00 01 05379 and M 00 01 05380, both filed in Argentina on Dec. 1, 2000. This invention relates to means for mounting water closets on supporting surfaces such as walls, floors and other fixtures. The term "water closets" is intended to mean any contrivance for carrying off toilet discharges through a waste pipe below by the agency of water, and includes sanitary fixtures such as toilet bowls, bidets, urinals, wash basins and the like.

Bathroom toilets, for example, are generally installed by fitting the side or rear openings of the toilet bowl and anchoring it to the floor with bolts, attaching the toilet bowl with nuts and washers after previously inserting the trap discharge end into the floor drain. In general, supporting the toilet body on the floor requires certain precautions because of the fragile nature of the material of the toilet, and the nuts must be tightened carefully in order to avoid cracking or breaking the base of the bowl. Due to irregularities in the floor level or defects in the installation of ceramic tile or flooring, this type of installation causes formation of cracks or gaps between the supporting edge of the toilet and the toilet itself, which allows flushing water or waste matter, sewage, etc. to enter the inside of the toilet base and, in turn, allows odors to escape from the coupling between the trap and the drain line if this connection has not been properly sealed off.

This problem has generally been obviated by placing a gasket made of rubber, mastic or some other isolating material in the supporting area of the bottom edge of the toilet body, and for this reason the fixture must have been previously supported. Although this procedure provides a temporary solution of the problem, it is not very effective because the mastic tends to deteriorate or because the rubber gasket is not properly seated.

In general, the installation of toilets is not a complicated procedure because only a couple of screws or bolts are required to attach this type of fixture to the floor, and the joining of its waste outlet to the drain line is a simple plug-in procedure.

Most of these fixtures are installed with the bottom edge of the bowl resting on the floor, which tends to cause certain drawbacks because, in some cases, the floor has irregularities in the placement of the flooring or ceramic tiles, thus creating, along the supporting edge of the fixture, gaps or passageways for the flush water or for the escape of gases from the sewer line.

This drawback is usually remedied by placing an isolating material between the aforesaid edge and the floor, which makes it possible to isolate the interior of the bowl or base from the environment and which, at the same time, can be easily removed in order to take out the fixture whenever some problem occurs. To this end, it is also customary to apply, between the edge of the fixture and the floor, rubber rings that absorb the aforementioned irregularities between the floor and the edge of the fixture, but it is difficult to adapt them to the various models of fixtures currently on the market.

Despite the use of these elements, it has not proved possible to solve the problem of entry of water or filth into toilet bowls, which over time undergo deterioration due to the incomplete sealing of the fixture support, nor the problem that causes the escape of gases from the waste line.

SUMMARY OF THE INVENTION

In the following description toilet bowls are referred to for purposes of description, but it should be understood that the invention applies equally to other types of water closets as well.

In order to successfully maintain the proper installation of a toilet on the floor without using any kind of adherence by adding isolating materials, and in order to ensure rapid installation without any risk of cracking the toilet bowl, aside from floor irregularities, a feature of this invention comprises a toilet sealing gasket whose annular shape can be adapted to the shape of the various toilet models available on the market.

In one embodiment the sealing gasket of this invention consists of an integral annular member and has an essentially flat core serving as a supporting seat for the bottom edge of the toilet body. This makes it possible to correct for any irregularities that might be present on said edge and any differences in the bathroom floor level.

Surrounding the perimeter of this annular seat of the gasket is a small flange or projection that covers the perimeter of the outside edge of the toilet base, thereby preventing waste or water used for washing the floor from penetrating the inside of the toilet. The inside of said seat is also surrounded by a rib for sealing the inner surface of said base, thereby preventing the escape of gases and any waste water discharged for unforeseen reasons. The rib is slightly higher than the small outer flange of the gasket and has an inverted L-cross section with a vertical leg having a triangular cross-section which, in conjunction with its other leg connected to the inner edge of the seat, forms a means of hinging for purposes of providing slight flexibility with respect to the support of the toilet base.

This rib, located at symmetrically opposed points, is interrupted by respective cylindrical or oblong bushings that allow the passage of the toilet anchor bolts, with said bushings being located laterally from and toward the inside of the annular seat in order to allow for the free support of the toilet body.

In one embodiment the seat core has one trapezoidal projection and three or more sawtooth projections opposite a half-shaft rib.

In one embodiment the gasket consists of an integral member formed of molded plastic, preferably polyvinyl, rubber or a similar elastically formable material, with said member having an oblong annular section whose overall shape matches that of the lower supporting edge of a given fixture model and which delimits between its inner and outer edges a flat annular seat for supporting the fixture properly positioned along said edges, by means of a flange and a rib supported against the inner and outer surfaces, respectively, adjacent to the supporting edge of said toilet. The plastic member also includes a section of gasket and seal for connecting the toilet discharge line with the sewer line located on the floor, with said section, in one embodiment, being basically made up of an annular wall or area with concentric corrugations that has a circular inner lip for sealing off the point where the discharge line is connected to the sewer line, which on the exterior is connected to and superimposed on the annular toilet supporting seat and which, below the lip, has a vent-type boot for connecting said connection point with a lower support in order to prevent the escape of water or sewer gases.

In other embodiments, instead of the boot making up the section of gasket and seal for discharge line and sewer pipe, the gasket consists of a series of concentric ribs of varying heights that rest on the floor in order to prevent the escape of water or sewer gases and, instead of a lip, a tubular extension of an upper base connected to the annular seat.

In all embodiments this portion of gasket has a union with the annular portion of the gasket that allows for adapting to dimensional differences that might be present during the installation of the toilets or other sanitary fixtures.

Thus the invention provides a gasket for sealing the supporting edge of toilet bowls or bases against the floor, specifically a gasket for supporting the body of a toilet against the floor for isolating the inside of the toilet from the surrounding environment.

The subject of the invention is an oblong gasket or washer made of non-rigid material such as slightly elastic plastic, rubber or the like in order to ensure a tight fit with the irregularities of the aforesaid supporting edges of toilet bowls, as well as any other sanitary fixture, bidet, urinal, wash basin, etc., being attached to both the floor and the wall, as well as between fixtures, thereby producing a water-tight union that seals off the entire perimeter, preventing leakage of sewage and internal and external liquids. The material, which may have an anti-bacterial additive, provides a continuous and annular edge-supporting seat that allows for attaching said body without risk of deterioration of the material of the bodies, which is usually fragile.

This invention further relates to a gasket for supporting and sealing the bottom edge of the body of a toilet, which accommodates floor-anchoring bolts used for providing the proper support of the aforesaid body with respect to any irregularities in the floor, and provides an interstice seal created by supporting the body on the aforesaid seal by means of a small outer annular flange and another inner annular rib surrounding the supporting seat of the aforesaid bottom edge of the body.

The invention further relates to a gasket consisting of an annular member specifically designed to serve as a support for the bottom edge of toilet bowls and whose cross section has a flat seat so that it can be inserted between the aforesaid edge and the floor, and whose perimeter is in the form of a low projection that rests closely against the outer surface of the toilet body in order to prevent the entry or escape or deposit of water or sewage around the entire perimeter, with the inner edge of said seat being adjacent to the supporting edge of the body and intended to prevent the passage of gases from the line or pipe for evacuating matter carried by the discharge of water.

The invention further provides a gasket whose inner flange or rib for sealing the inner surface of the body is configured vertically above the supporting seat of the bottom edge of the body and has an L-shaped cross section with a triangularly shaped vertical leg for providing an inclined and broken outer flat surface at the level of the top edge of the seat, thus forming a protruding annular edge that together makes up an annular entrance in the joint of said vertical leg with a lower leg that is inclined toward the inside of the annular seat, being a means of hinging the vertical leg for its support against the inner surface of the toilet with respect to the support of the toilet against the gasket seat.

This invention further provides a gasket that can have various circumferential shapes so that it can be adapted to different models of toilets that consequently have different edge shapes on the lower support edges against the floor.

This invention further provides a gasket for the supporting edge of a toilet, as well as any other sanitary fixture, bidet, urinal, wash basin, etc., being attached to either or both the floor and the wall, as well as between fixtures, thereby producing a watertight gasket that seals off the entire perimeter, preventing leakage of sewage and internal and external liquids, with the material having an anti-bacterial additive, and providing a continuous and annular seat whose shape conforms with the supporting edges of various fixture designs, thereby making it possible to match up with manufacturing irregularities in said fixtures, as well as uneven floor levels, and means integral with said seat for sealing off the joint or coupling between the drain of the fixture and the waste line.

This invention further provides a gasket that is easily adapted to different toilet bowl models or designs, in that it consists of an integral piece of molded plastic, preferably polyvinyl, rubber or the like having slightly elastic characteristics in order to achieve a tight seal with respect to any irregularities present in the fixture, the floor or the piping.

This invention further provides an improved gasket of the type consisting of an oblong annular section made up of a ring with a flat area serving as a supporting seat for the bottom edge of the fixture surrounded by an outer flange providing contact with the outer surface of the fixture surrounding its supporting edge, and a vertical rib that surrounds the inside of said seat for its contact with the inner surface of the fixture, thereby forming a tight seal preventing the passage of water or sewage, with this annular section integrally connected to a gasket section and plug-in seal to the outlet of the toilet with the drain line, intended to provide a connection between both lines and to encompass the gasket by means of a circumferential wall that can be shaped to fit and seal against the floor.

This invention further provides a gasket that comprises a packing and sealing section located between the trap and the drain line, integrally connected to an annular seat equipped with a surrounding inner rib whose shape can be modified so that said gasket can be applied to various current designs of bathroom fixtures.

This invention further provides a gasket that, given its inherent features, offers other possibilities for simultaneously sealing the lower supporting edge of the toilet and the connection of the trap with the drain line, and that provides various embodiments adaptable to different models of bathroom fixtures currently on the market.

DETAILED DESCRIPTION

Figures 1, 2, 3, 4:
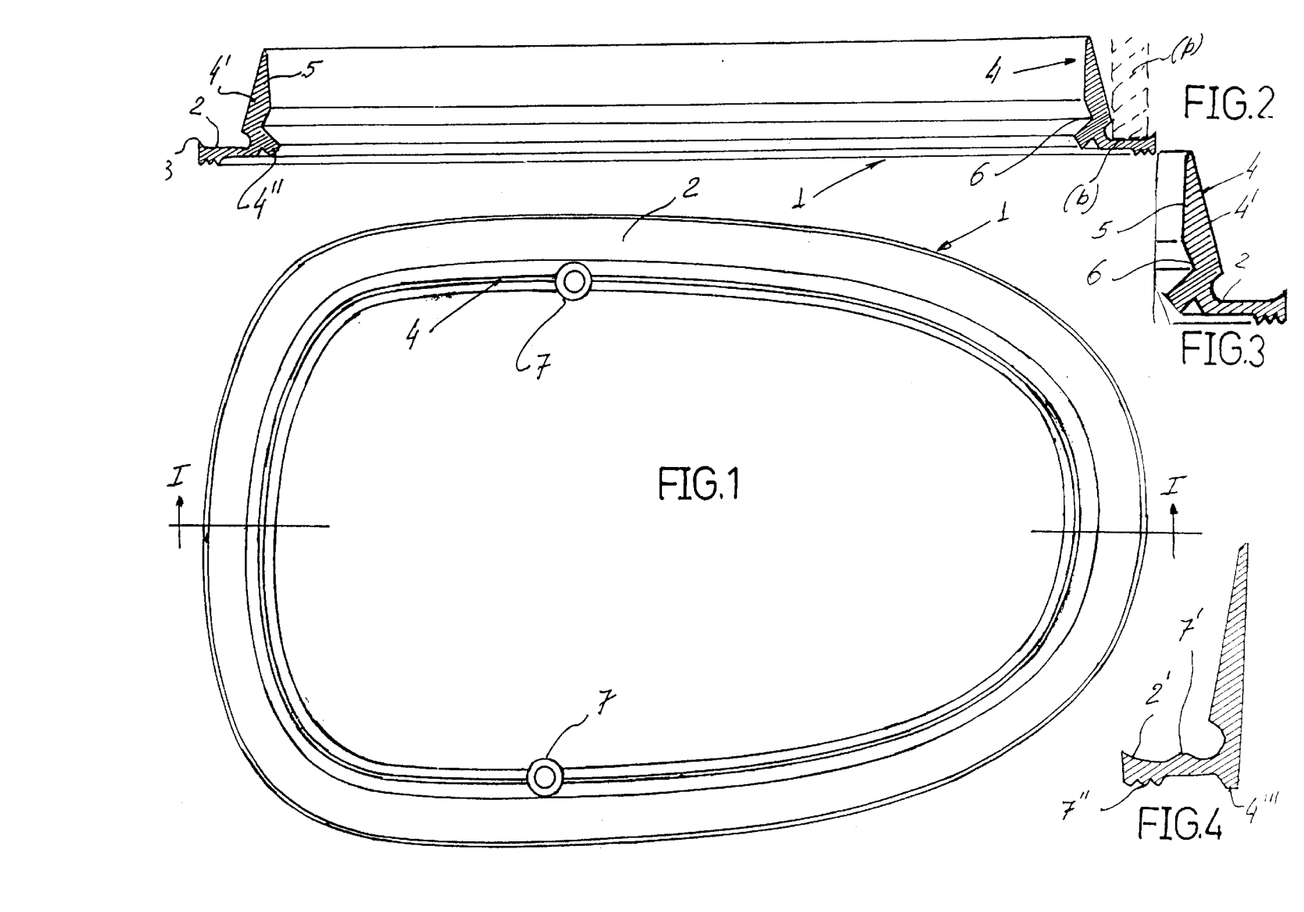
FIG. 1 is a top plan view of the sealing gasket in a first embodiment of the invention.
FIG. 2 is an elevation in section along line I—I of FIG. 1.
FIG. 3 is an elevation detail of the aforesaid gasket, showing the shape characteristics of the inner flange of the gasket.
FIG. 4 is a sectional elevation of the gasket in a second embodiment.
Figure 5:
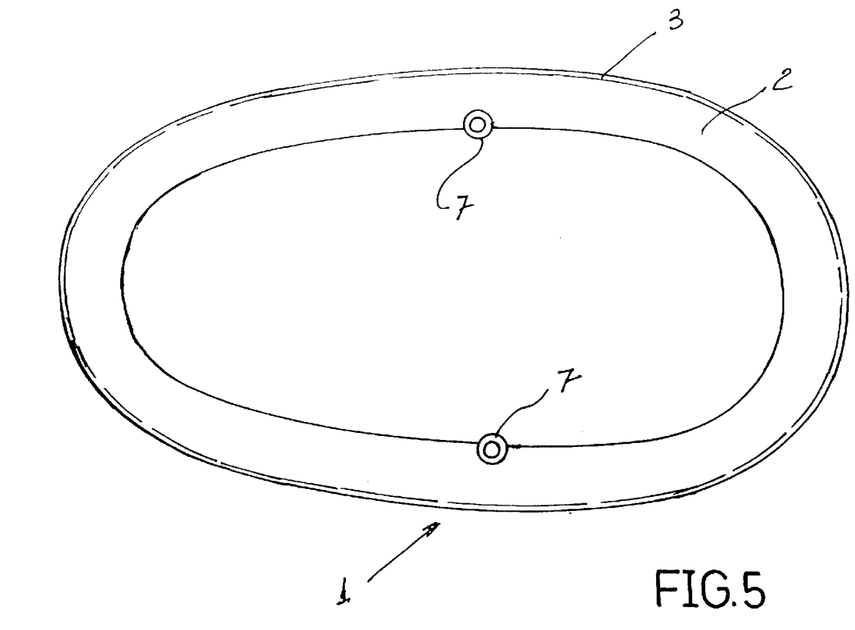
FIGS. 5 through 8 show different shape variants of the sealing gasket corresponding to various models of toilets used on the market.
Figure 6:
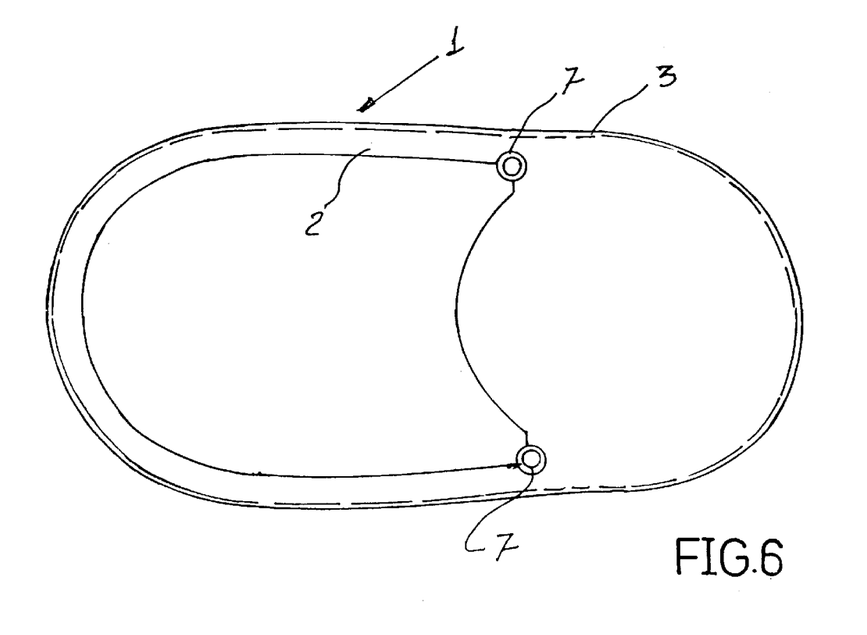
Figure 7:
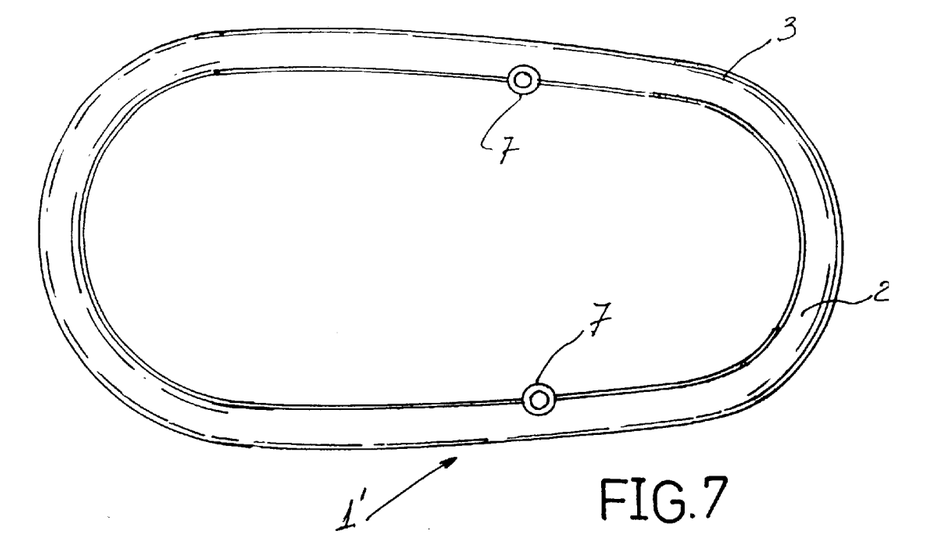
Figure 8:
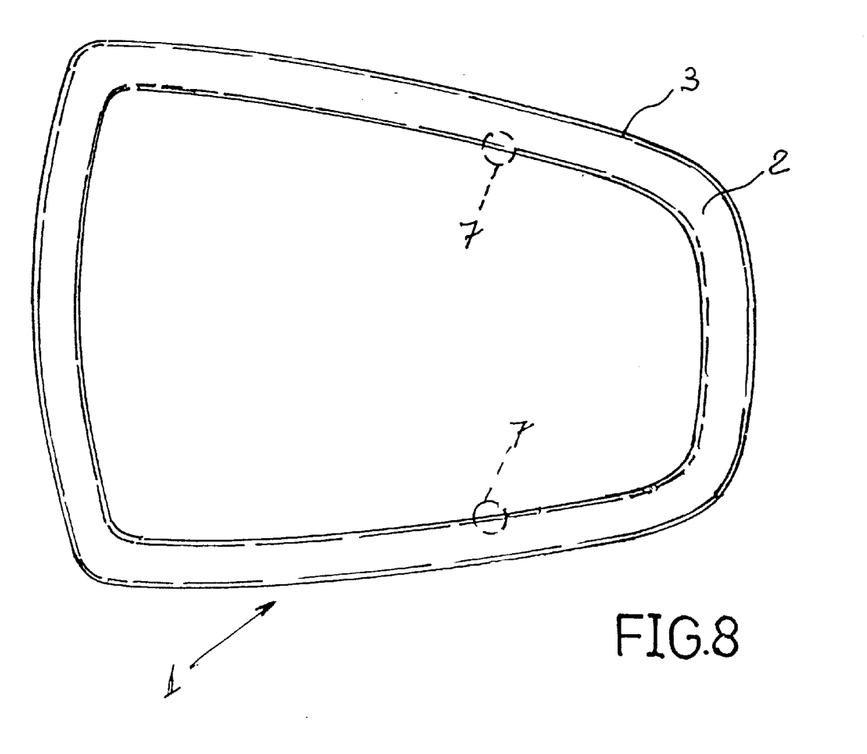

Referring to the drawings and in particular to FIGS. 1 to 3, which correspond to a first embodiment of the sealing gasket according to this invention, identified in general by the reference numeral 1, the gasket consists of an annular member made of molded plastic, preferably polyvinyl, or some other elastically formable material such as rubber or the like. In cross section this annular member consists of a seat 2, which is flat and has a uniform thickness for supporting the bottom edge (b) of the base (p) of a toilet, shown in broken lines, with said seat 2 being surrounded on the outside by a small flange 3 that extends beyond seat I in order to make contact with the outer surface of the edge (b) of the toilet base (p).

The perimeter of seat 2 is also enclosed internally by a rib 4, which is shown in detail and on a larger scale in FIG. 3. The cross section of this rib 4 has an overall L-shape, i.e., it is made up of two legs 4'–4" which form an angled edge facing seat 2 and connected to the bottom edge thereof. One of the legs 4' extends vertically and is slightly inclined above seat 2, and has a triangular cross section for providing with respect to said seat 2 an annular surface 5 in order to make contact with the bottom edge (b) of the base (p), with the other leg 4" being oriented toward the inside of seat 2 and connected to leg 4' by means of a section of lower opposed sides 6.

FIG. 4 shows another embodiment of the gasket wherein seat 2' has a projection 4''' and perimeter ribs 7" opposite rib 7'.

Member 1 contains integral bushings 7 at symmetrically opposed points to allow the passage of the bolts for anchoring the toilet to the floor.

The location of the base (p) on seat 2 exerts pressure of its inner surface against the area of grooves 6, thereby causing a slight bending of leg 4' toward said inner surface of the base (p) in order to act as a means of inner sealing thereof, which is additional to the sealing of its outer edge by means of edge 3 of member 1.

FIGS. 5 through 8 show the gasket described above whose shape is adapted to the various cross sections of the bases of the various models of toilets currently on the market, but this does not imply any change in its basic features.

Figures 9, 10, 11:
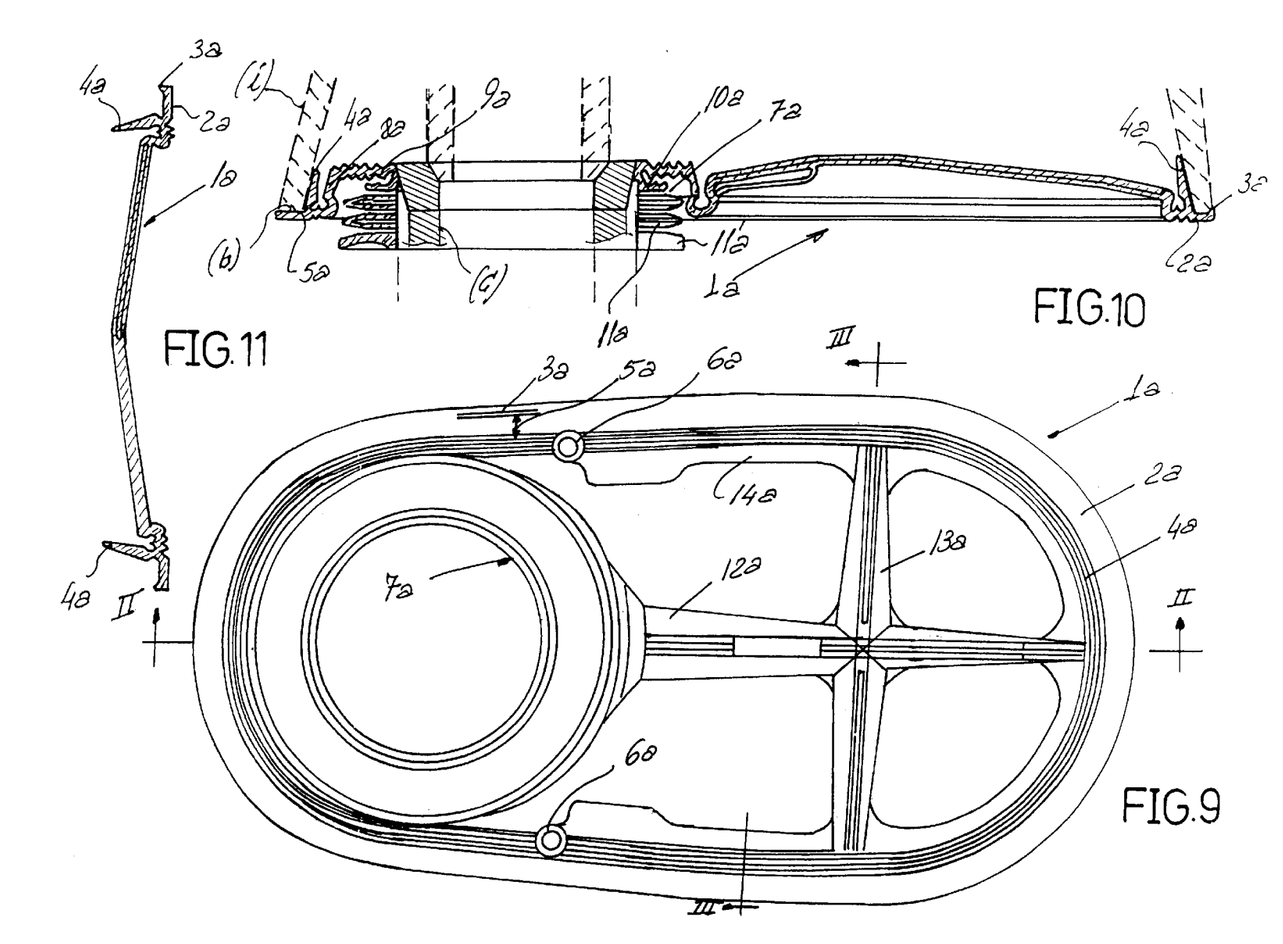
FIG. 9 is a top plan view of another embodiment of the gasket according to this invention.
FIG. 10 is an elevation in section along line II—II of FIG. 9, showing the location of the gasket with respect to the supporting edge of the toilet and to the connection of the toilet drain to the sewer line.
FIG. 11 is an elevation in section of the gasket along line III—III of FIG. 9.

FIGS. 9 through 11 show another embodiment of this invention, which is an improved gasket for simultaneously sealing the supporting edge of toilet bowls or bases against the floor and the connection of the drain outlet of such toilets with the sewer line, and which is identified by the general reference numeral 1a. This comprises an integral member made of molded plastic, preferably polyvinyl, rubber or the like with slightly elastic properties.

As already described, gasket 1a consists of an oblong annular section 2a, with an outer flange 3a that surrounds the outer perimeter of said section 1a, and a rib 4a that also surrounds the entire perimeter of (p) or part thereof, and that is connected in a slightly articulated manner. Outer flange 3a and rib 4a, which extends vertically above flange 3a, constitute means for sealing the surfaces adjacent to supporting edge (b) of a toilet (i), as can be seen in FIG. 10, and form the edges of flat annular seat 5a in said section 2a of gasket 1a, thereby preventing the passage of liquids or sewage.

In this embodiment the shape of oblong annular section 2a matches that of a specific model of toilet with symmetrical bushings 6a with respect to its longitudinal axis for the fastening bolts of the toilet (i).

In accordance with this embodiment and as an integral part thereof, this annular section 2a consists of a packing and sealing section 7a for the connection of the drain of toilet (i) to the sewer line (c) located in the bathroom floor. This packing and sealing section 7a is made up of an elastically bendable sleeve that has a cylindrical wall 8a extending vertically from one end of said annular section 2a and connected, inside the length of a semicircular segment thereof, to the base of the rib as a hinging means to allow for its elastic deformation. The top of this cylindrical wall 8a has a base wall 9a with concentric corrugations and an inner lip 10 for covering the end of the sewer line (c), adapting to and surrounding the drain of the toilet (i).

Adjacent to the inner lip 10a and located concentrically thereto, and suspended from the bottom of base wall 9a, is a boot 11'a, which terminates with a vent-type socket for support against the floor.

Cylindrical wall 8a of the packing and sealing section 7a has a free semicircular segment between opposing legs of annular section 1a, and is connected to the end of a longitudinal member 12a, which connects this semicircular segment to an inner point of the outer curved portion of annular section 2a, opposite the connection point of the aforesaid section 7a. This member 12a is connected to a transverse member 13a, which connects to opposite lateral parts of the annular section, thereby forming a cross member that is partially superimposed on or raised above section 2a, and which has at the ends of members 12a–13a hinging means that allow annular section 1 to be extended so that it fits into the particular shape of the supporting edge (b) of the toilet (i).

This embodiment is completed by means of flat ribs 14a, which extend between members 12a–13a from rib 4a to bushings 6a, thereby permitting said flat ribs 14a to retain their shape with respect to gasket 1a.

Installation of gasket 1a is thus simple: installing packing and sealing section 7a concentrically on sewer line (c) and supporting socket 11a of boot 11 against the floor, then aligning bushings 6a with the floor bolts and positioning annular seat 5a with the bottom edge (b) of the toilet (i), with the toilet resting on the floor, after having previously fitted gasket 1a to the shape of the toilet (i) by manipulating its sides by virtue of the flexibility offered by the flexible joints at the ends of members 12a–13a and of cylindrical wall 8a of section 7a.

Figure 12:
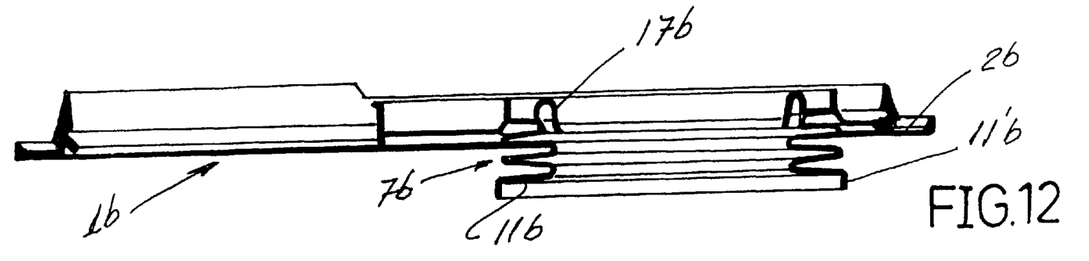
FIGS. 12 and 13 are, respectively, an elevation in section and a top plan view of another embodiment of the gasket of this invention.
Figure 13:
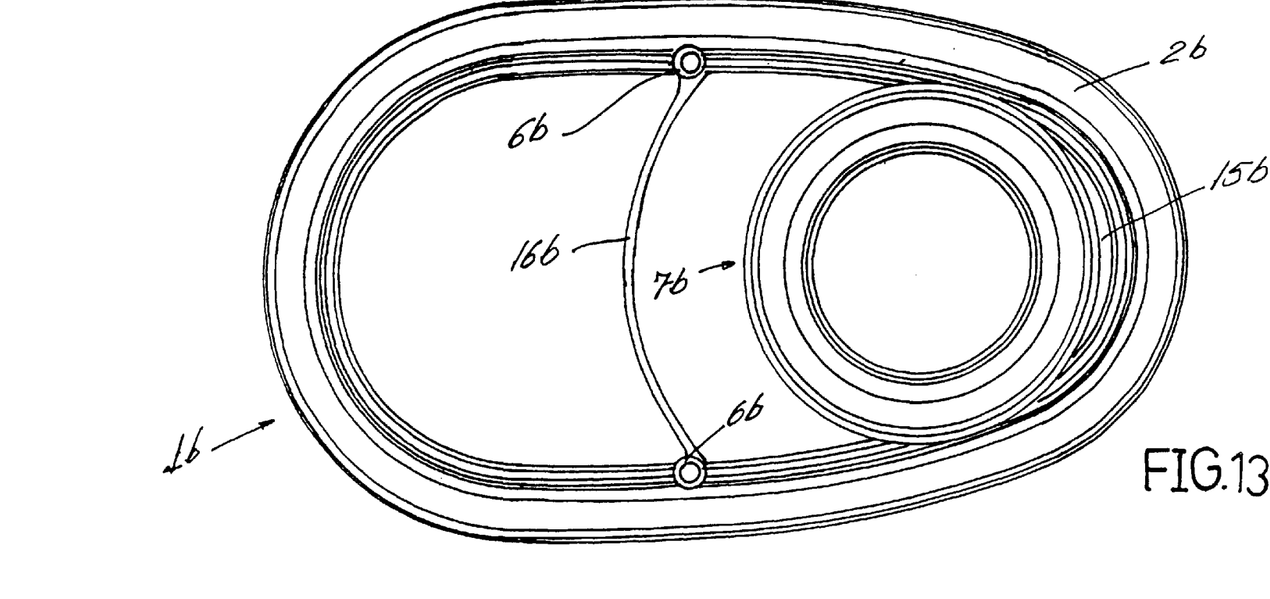

FIGS. 12 and 13 show another embodiment of this invention, wherein the gasket 1b consists of an annular section 2b shaped for a different design model of toilet from the application of gasket 1a shown in FIGS. 9 to 11. In this embodiment, the features of annular section 2b are the same as described above, but the packing and sealing section 7b or elastic bushing is offset with respect to the center of curvature of the smaller radius end of annular section 2b. Packing and sealing section 7b is integrally connected to annular section 2b by means of rib 15b in the shape of a crescent with opposite sections of annular section 2b being connected by curved member 16b, which connects bushings 6b of gasket 1b in order to prevent deformation of gasket 1b. In this embodiment packing and sealing section 7b has a boot 11b, whose top base has a tubular extension 17b, which is concentric with the boot and has its outlet oriented toward the inside of boot 11b and is also equipped with vent-type socket 11'b for seal support on the floor. Tubular extension 17b fits between the toilet drain and the sewer line, thus sealing the connection.

Figures 14, 15:
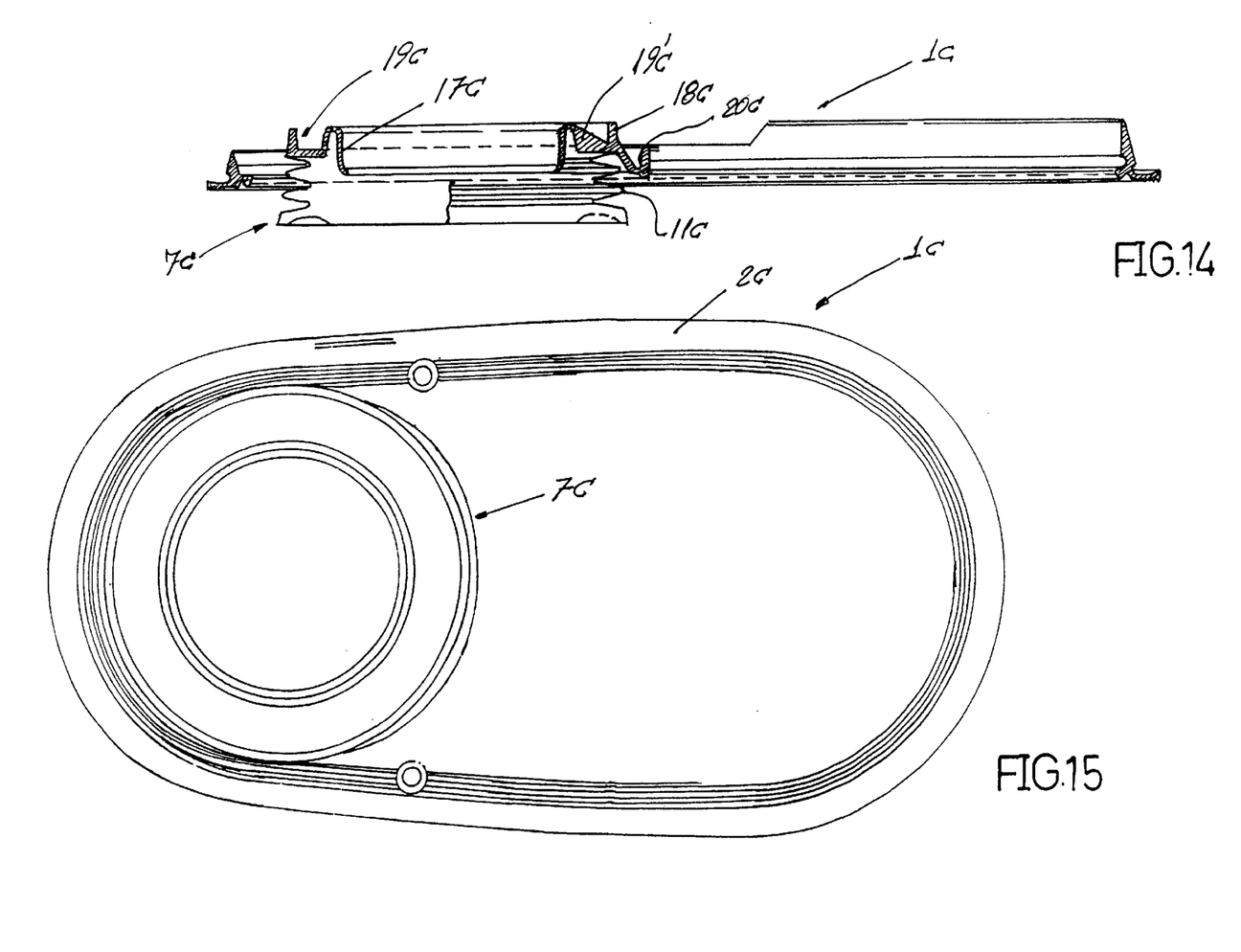
FIGS. 14 and 15 are, respectively, an elevation in section and a top plan view of another embodiment of the gasket of this invention.

FIGS. 14 and 15 show another embodiment of this invention, wherein the same gasket 1c consists of an annular section 2c with a shape appropriate for a given model of toilet and packing and sealing section 7c for making a connection between the toilet drain and the sewer line. The aforesaid packing and sealing section 7c or elastic sleeve is integrally connected to the inside edge of annular section 2c to provide for free hinging action, and it is made up of boot 11c , with features similar to the one previously described in other embodiments but whose top end has a tubular extension 17c , which extends concentrically to boot 11c toward the inside of the boot in order to form a sealing sleeve on said connection. Tubular extension 17c on the end of boot 11c ends with rib 18c with an annular groove 19c , which has reinforcing ribs 19'c and which is flanged below by a grooved wall 20c on the portion of boot 11c opposite the side where the boot is attached to annular section 2c .

Figure 16:
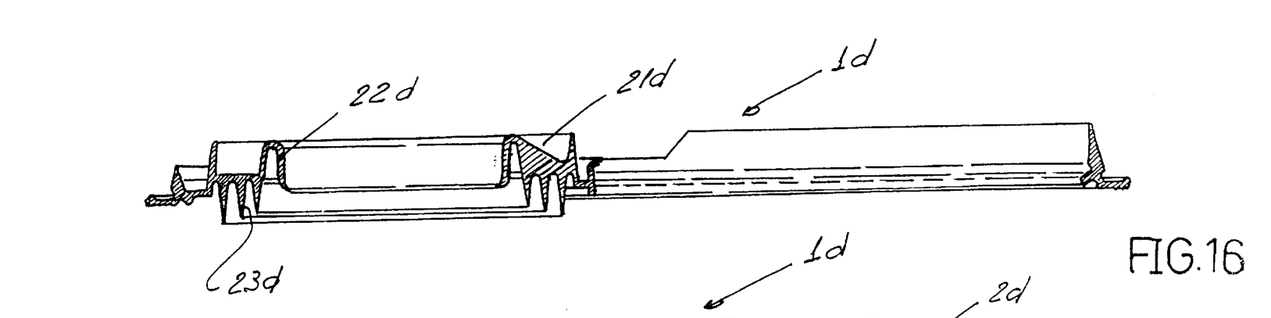
FIGS. 16 and 17 are respectively, an elevation in section and a top plan view of another embodiment of the invention.
Figure 17:
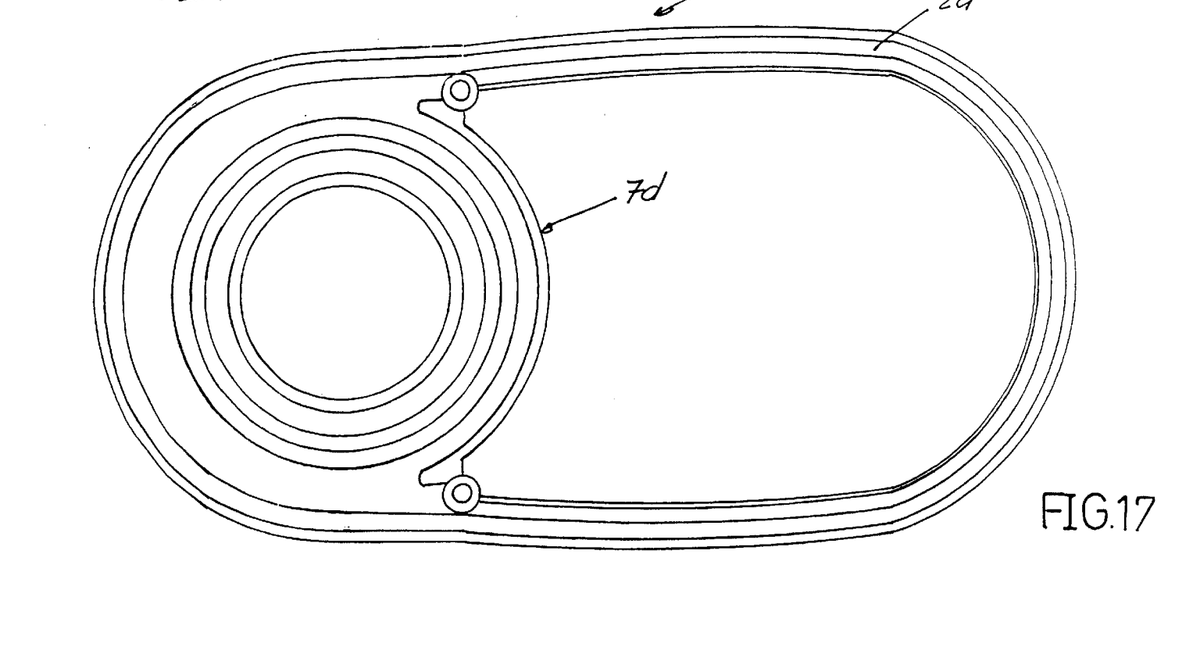

FIGS. 16 and 17 show another embodiment of this invention, wherein annular section 2d of gasket 1d comprises a packing and sealing section 7d, connected semicircumferentially to said section 2d, which in turn has a shape matching that of another model of toilet. In this embodiment packing and sealing section 7d has an upper end comprising an annular groove 21d, whose inner wall extends concentrically and toward annular section 2d, thereby forming a water-tight tube 22d for installation in the sewer line where it connects with the toilet drain. Instead of a boot, the bottom of the groove has a series of concentric fins or ribs 23d, radially spaced and of decreasing heights toward the geometric axis of annular groove 21d, which provides a support on the floor to seal off any kind of losses in the connection between the toilet drain and the sewer line.

Figure 18:
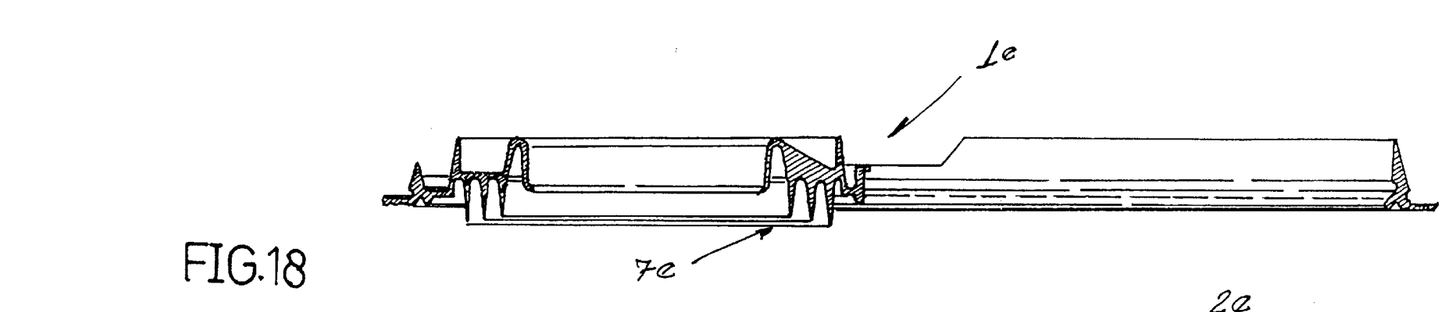
FIGS. 18 and 19 are respectively, an elevation in section and a top plan view of another embodiment of the invention.
Figure 19:
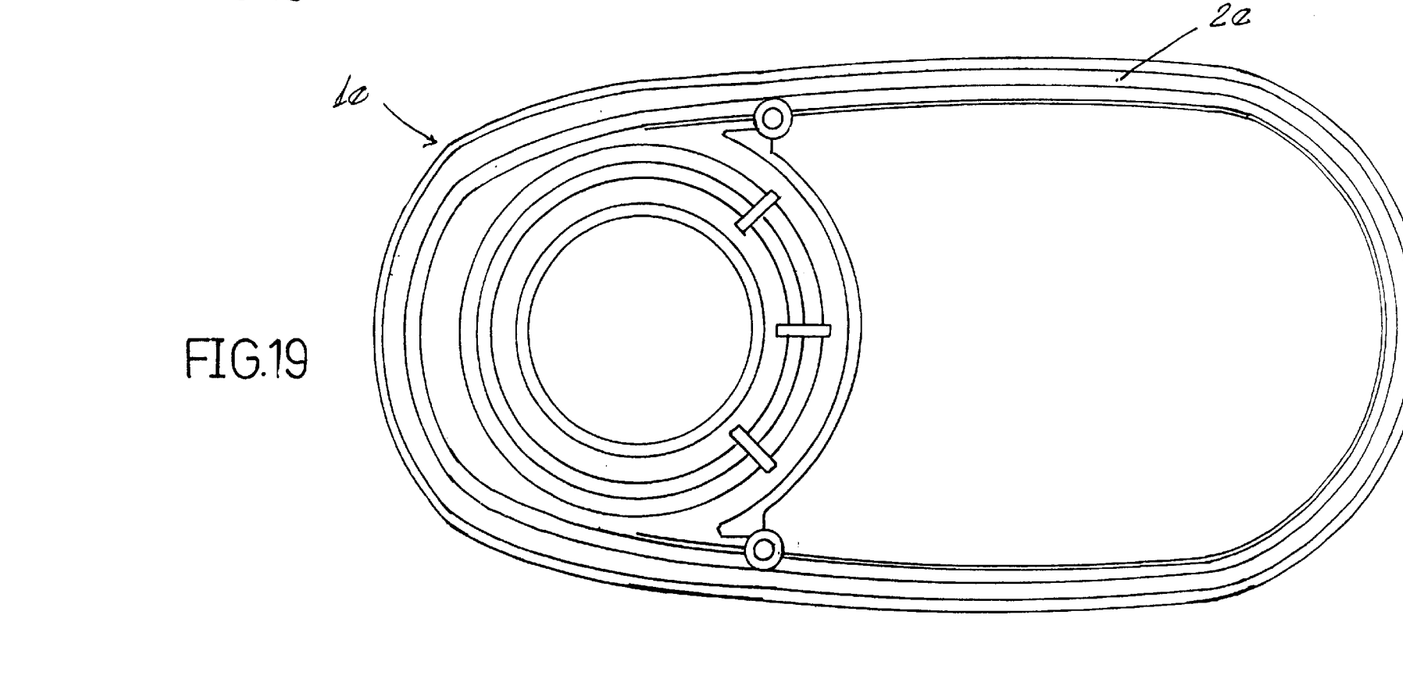

FIGS. 18–19 show another embodiment of this invention, wherein annular section 2e of gasket 1e is shaped for a specific model of toilet, which is different from those of previously described embodiments and which is equipped with a packing and sealing section 7e similar to that described in the embodiment of FIGS. 16–17.

Figure 20:
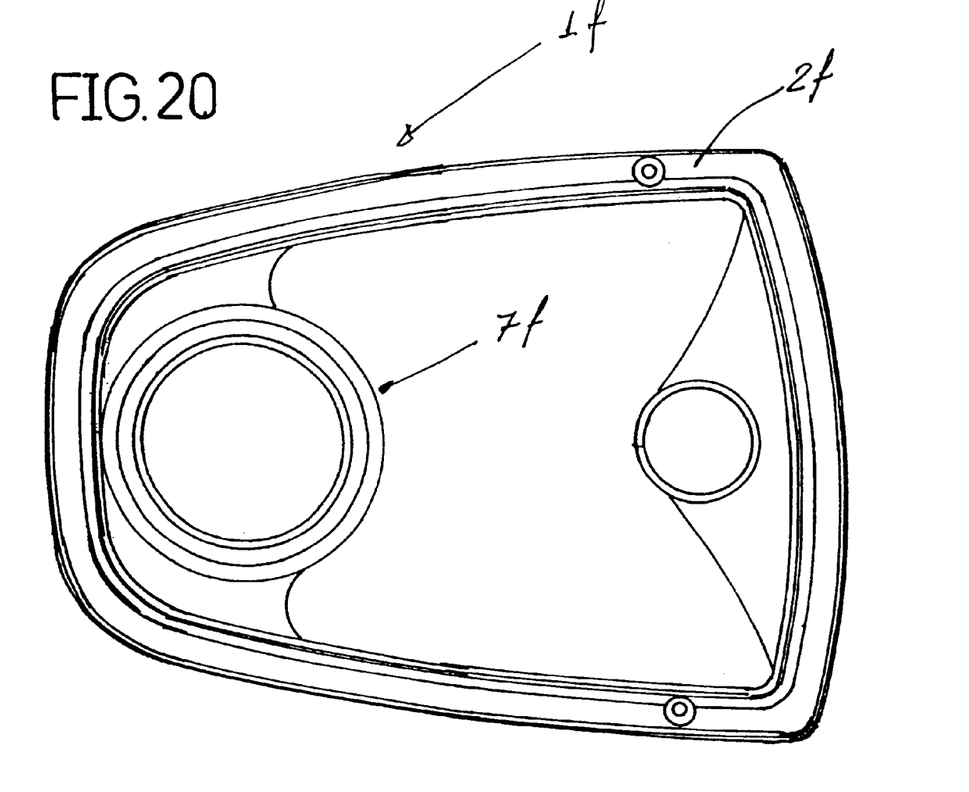
FIG. 20 is a top plan view of another embodiment of the invention.

FIG. 20 shows another embodiment of this invention, wherein the annular section 2f of gasket If has a specific shape for a modem toilet model design and which incorporates the same packing and sealing section 7f used in the embodiments of FIGS. 9–11 or 16–17. Installation of the gasket in all the embodiments is similar to that described for the embodiment of FIGS. 9–11, and all the embodiments may incorporate any of the packing and sealing sections described herein without alterations of their functions as herein described.

What is claimed is:

1. A gasket for sealingly fastening a water closet fixture to a supporting surface, the fixture formed with a base having a perimeter for attachment to said surface and forming therewith an interior space, said space being adapted to enclose a connection between the waste water discharge of the fixture and an external drain line with said connection sealingly isolated from said interior space, comprising a unitary body of elastic material formed to extend around the perimeter of the base of the fixture and having in cross section a seat for said attachment, and an L-shaped rib flexibly connected with the seat and comprising a vertical leg inwardly inclined from the seat and a second leg directed inwardly of the seat and forming a corner edge with said vertical leg, said corner edge projecting toward and above the seat, such that upon insertion of the perimeter of said base onto the seat said base exerts pressure on said corner edge to deflect and pivot said vertical leg toward said base.

2. A gasket according to claim 1, in which said second leg is flexibly connected with the seat.

3. A gasket according to claim 1, in which the seat has an outer perimeter having a vertical projection for sealing against the perimeter of the base.

4. A gasket according to claim 1, in which the seat has a plurality of mutually offset ribs projecting from a side thereof.

5. A gasket according to claim 1, in which said body has integral drain sealing means comprising a tubular portion flexibly connected with the seat inwardly of said rib and an annular inwardly projecting portion for sealing engagement with the drain line of the fixture.

6. A gasket according to claim 5, in which said tubular portion has an integral tubular and longitudinally flexible boot for sealing connection to said supporting surface around and externally of the drain line.

7. A gasket according to claim 5, in which a segment of the periphery of the tubular portion is flexibly connected to an adjacent portion of the seat, and including an integral stabilizing structure extending from another segment of said periphery to a nonadjacent portion of the seat.

8. A gasket according to claim 6, in which said inwardly projecting portion has an inner lip formed with a tubular sealing portion.

9. A gasket according to claim 5, in which the drain sealing portion includes an annular wall external to and concentric with said tubular portion and forming a groove therewith, radial reinforcing ribs in the groove, and an extension flexible toward said supporting surface for sealing connection thereto around and externally of the drain line.

10. A gasket according to claim 9, in which said extension comprises a plurality of concentric fins extending toward said supporting surface.

11. Gasket for sealing the supporting edge of toilet bowls or bases against the floor, in particular toilets having different types of bowls to be attached to the bathroom floor by means of bolts anchored to the floor making up a continuous seat around the perimeter adapted to the bottom edge of toilets having different designs, with said seat having a perimeter shape established by an outer flange and by an inner rib, the latter being vertical and flexible, which at the same time and with respect to the toilet support provide means of sealing against the outer and inner surfaces of the toilet adjacent to said supporting edge supplementing said seat for purposes of isolating the connection between the toilet drain outlet and the sewer line located in the floor, characterized by comprising an annular member made of elastically formable plastic that has a flat annular seat of uniform thickness for supporting the bottom edge of the aforesaid bowl on the floor, with the outside of said seat being formed by a slightly protruding edge with respect to said supporting seat against the upper edge of said bowl and with the inside comprising a rib with an L-shaped cross section having a triangularly shaped and inclined vertical leg integrally connected to one leg thereof and connected to the inner edge of the seat, both legs forming at their point of connection an annular edge upon which pressure can be exerted with respect to the support of the bowl on said annular seat for purposes of making contact between the vertical rib leg and the inner surface of said bowl and above the inner supporting edge thereof, with said member having at symmetrically opposed points bushings that form an integral part thereof and which extend vertically for purposes of inserting said bolts.

12. Gasket according to claim 11, characterized in that the flat annular seat has at its ends an inverted projection and a series of opposed and annular ribs with an inverted V-shaped section that are opposed to and offset from a half-shaft rib because said annular part comprises a means of sealing the connection between the toilet drain and the sewer line, consisting of a tubular section, also made of molded plastic and integrally connected to one end of said annular part in order to concentrically surround the sewer line and in order to be superimposed on the line with respect to the supporting edge of the toilet on the seat of said annular part, with said tubular section having an upperwall in the shape of a circular crown, located on a flat section which is parallel to and separated from the flat section of the seat of the annular part and which has a lateral extension for a flexible joint of the tubular section on, at least, a semicircular section that extends from the inner rib of the annular part, with the inner edge of the wall having the shape of a circular crown and being provided with a lip for sealing the toilet drain union with the sewer line, and with said wall being provided below with means for sealing the connection to the floor that are positionable on the floor with respect to interposition of the wall in a circular crown shape between said toilet drain and sewer line.

13. An improved gasket according to claim 11, characterized in that said tubular section has an upper wall in a circular crown shape possessing concentric corrugations, in which said wall also has a concentric inner lip that is elastically flexible for purposes of sealing the joint between the toilet drain and the sewer line, with said wall being laterally connected to a vertical extension thereof that is connected below to an articulation bend of the tubular section along a semicircular portion adjacent to the rib of the annular section, with the vertical extension being at a point that is directly opposite this latter section connected to the end of a longitudinal member that goes from the length of the annular section, opposite to that of incorporation of the tubular section, and which, together with a member transverse to the annular section, forms a stabilizing structure for the sections of the gasket, with the lower part of the wall having a circular crown shape and being provided with a sealing boot surrounding said coupling and having a vent-type socket for close support with the floor.

14. Joint according to claims 11 or 13, characterized in that the upper wall of said tubular section has an inner lip comprising a tubular bend that extends vertically and concentrically to the tubular section toward the sealing boot.

15. Joint according to claim 11, characterized in that said tubular section has an upper wall with a circular crown shape whose outer and inner edges are surrounded by vertical walls that delimit a groove with radial reinforcing ribs, with the inner vertical wall having a bent extension that constitutes a seal between the drain and the sewer line, and with the lower part of said upper wall constituting a sealing boot for the connection.

16. Joint according to claims 11 or 15, characterized in that said groove of the bottom part of the upper wall of the tubular section has a means for sealing the connection to the floor comprised of a series of concentrically placed fins, the heights of which decrease in the direction of their geometric axis.

* * * * *